G. AMBORN.
CHAIN PIPE VISE OR THE LIKE.
APPLICATION FILED DEC. 27, 1911.

1,054,662.

Patented Mar. 4, 1913.

2 SHEETS—SHEET 1.

Fig. 2ª

WITNESSES:

INVENTOR:
George Amborn,
By Attorneys,

G. AMBORN.
CHAIN PIPE VISE OR THE LIKE.
APPLICATION FILED DEC. 27, 1911.

1,054,662.

Patented Mar. 4, 1913.

2 SHEETS—SHEET 2.

WITNESSES:
René Buine
Fred White

INVENTOR:
George Amborn,
By Attorneys,
Fraser, Turk & Myers

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

CHAIN PIPE-VISE OR THE LIKE.

1,054,662. Specification of Letters Patent. Patented Mar. 4, 1913.

Application filed December 27, 1911. Serial No. 668,061.

*To all whom it may concern:*

Be it known that I, GEORGE AMBORN, a citizen of the United States, residing in Chapinville, in the county of Litchfield and State of Connecticut, have invented certain new and useful Improvements in Chain Pipe-Vises or the Like, of which the following is a specification.

This invention relates to chain pipe vises or the like and aims to provide certain improvements therein.

Chain pipe vises as commonly constructed usually comprise a pair of jaws having working faces upon which the pipe rests, a chain adapted to pass around the pipe, and having one end connected with a screw or other take-up mechanism, the other end of the chain being adapted to be locked in varying positions to the bed-plate of the device. In such constructions the chain is tightened by a movement of the end which is connected to the take-up device, the chain slipping around the pipe until the desired tension is reached.

According to the present invention I provide a construction in which a bed plate carries the pair of jaws and the chain, one fixedly and the other adjustably and in which the take-up device operates to produce a relative movement between the jaw and both ends of the chain so that the pipe is pressed against the jaws uniformly without any substantial twisting movement. In this construction the chain may be locked in varying positions to adjust it roughly to pipes of different diameters and may then be tightened more quickly because of the fact that it is in effect shortened at both ends. In the preferred construction the take-up device acts against both ends of the chain, the jaws being stationary or fixedly mounted on the bed plate.

My invention also provides certain improvements in the take-up mechanism by which a quick adjustment is provided, so that the slack in the chain may be quickly compensated for, and in addition there is also provided a slow or power adjustment by which the chain may be tightened with the requisite force about the pipe.

The invention also includes certain other features of improvement which will be hereinafter pointed out.

Figure 1:
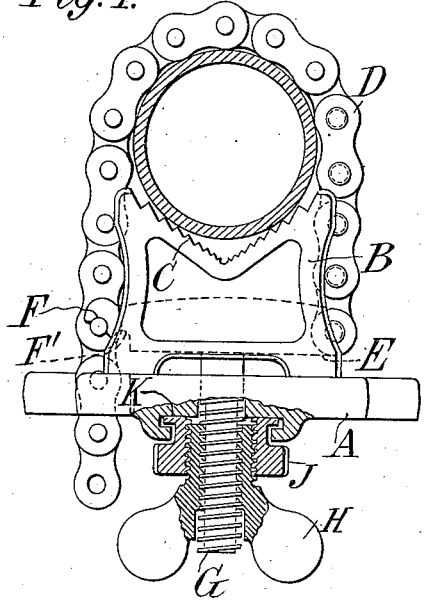
Figure 2:
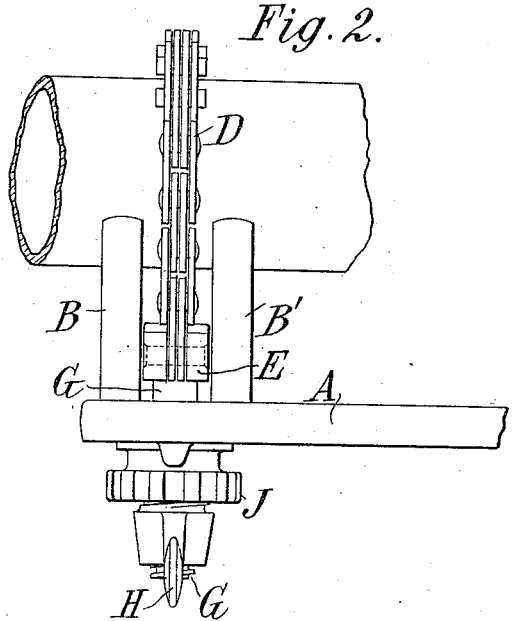
Figure 2:
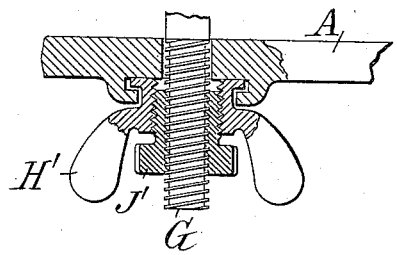
Figure 3:
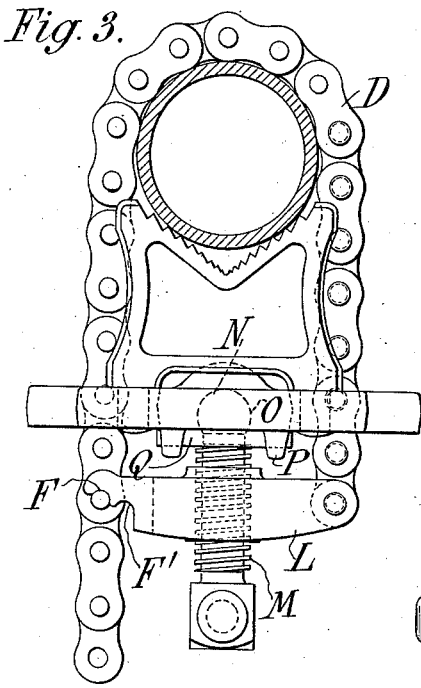
Figure 4:
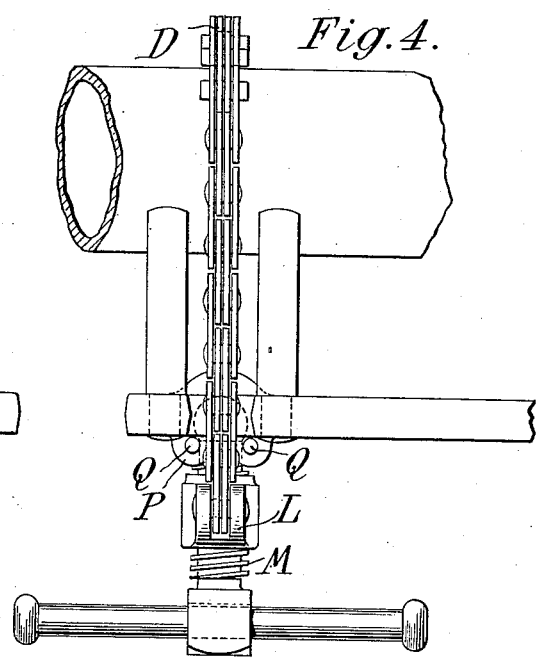
Figure 5:
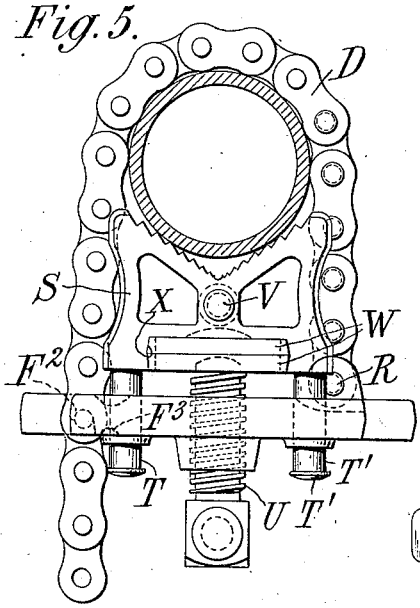
Figure 6:
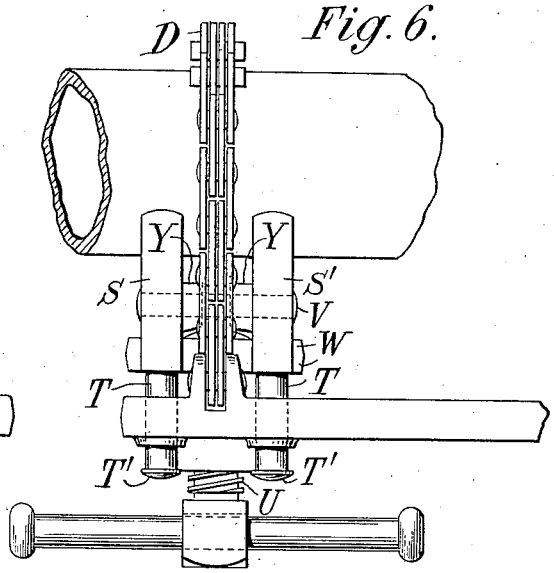

Referring to the drawings, which illustrate several forms of the invention, Figure 1 is an end elevation of one form of the device partly in section. Fig. 2 is a side elevation thereof. Fig. 2$^a$ is a vertical section of a modified detail. Fig. 3 is an end elevation of another form of the device. Fig. 4 is a side view of Fig. 3. Fig. 5 is an end elevation of a third form; and Fig. 6 is a side view of Fig. 5.

Referring first to Figs. 1 and 2 of the drawings, let A indicate a suitable bed-plate upon which are mounted the jaws B B', each of which is provided with a working face C of appropriate contour designed to receive the pipe, which is held in place by chain D. In the usual construction one end of the chain D is connected with a take-up mechanism and the other end is adapted to adjustably engage a lock formed on the bed-plate A.

In the construction shown in Figs. 1 and 2, I provide a movable yoke or cross-piece E which is preferably located between the jaws B B' and is adapted to be moved bodily in a vertical direction. To one end of the cross-piece E the chain D is pivoted or otherwise fixed, while the opposite end of the cross-piece is provided with a lock or locks F F' designed to adjustably engage the free end of the chain. Preferably both ends of the cross-piece E are bifurcated to receive the chain.

The cross-piece E may be moved downwardly to tighten the chain by any suitable mechanism, but I prefer to connect it with a screw-threaded bolt G which may be formed integrally therewith, the bolt preferably passing downwardly through the bed-plate A and being there provided with a suitable take-up mechanism such as a hand operable nut or the like.

The mechanism which I prefer to employ for this purpose is illustrated in Figs. 1 and 2. In this construction the bolt G is provided with a differential screw comprising a power-nut H and a speed-nut J. The power nut H directly engages the screw while the knurled nut J engages a screw thread formed on the inner end of the power nut. The inner face of the speed nut J contacts with the under side of an abutment K formed on or connected to the bed-plate. The threads of both nuts H and J are right-hand, but the thread of the power nut H is coarser than that of the speed nut. The effect of this construction is that when the speed nut J, which is intended for quick adjustments, is rotated, the bolt is drawn down quickly. If desired both nuts may be grasped by the operator in this movement. When the slack in the chain has been taken up and the power nut H is turned, it screws upon the bolt G upwardly and unscrews from the knurled nut J. As the thread on the bolt and interior of the power nut is coarser than the thread upon the knurled nut, the bolt G will move downwardly with a speed which is equal to the difference between the threads. Consequently a very considerable development of power can be attained without the necessity of very fine threads.

In Fig. 2$^a$ I have illustrated a similar construction which does not, however, act in a differential manner. In this construction the knurled nut engages the bolt G while the power nut engages the exterior of the knurled nut. In this case the power nut is formed with a fine thread and the knurled nut with a coarse thread, both threads having a right-hand pitch. When the knurled nut is operated the bolt G is drawn down quickly because of the coarser thread, while, when the power nut is operated it is drawn down more slowly but with greater power because of the fine thread of the power nut. In either construction shown a small and compact take-up mechanism is provided by which quick adjustments are obtained by the speed nut, and finer and more powerful adjustments by the power nut.

In Figs. 3 and 4 I have shown a modification of the construction illustrated in Figs. 1 and 2. In this construction the cross-piece or yoke L instead of being located between the jaws is arranged beneath the bed-plate, the latter being formed with holes to permit the chain to pass through it. The lever, as before, is connected to the chain at one end by a fixed connection and at the other end is formed with locks F F'. The lever L is not, however, in this construction provided with a bolt passing through the bed-plate, but is provided with a screw-threaded hole through which works a hand-operated bolt M. The upper end of this bolt is preferably rounded as shown at N and fits in a socket O; beneath the rounded head N is a neck P which is engaged by a pin or pins Q adapted to support the bolt and prevent the same from dropping out when the chain is slack. As shown in these figures the chain is adjusted as before by tension on both of its ends. The construction also involves the advantageous feature of permitting the cross-piece or yoke L to tilt slightly so that any strains developed upon the chain may be equalized.

In Figs. 5 and 6 I have illustrated another modification in which one end of the chain D is fixedly connected to the bed-plate at R, and the other end is adapted to engage locks F$^2$, F$^3$ formed on or carried by the bed-plate. In this construction, instead of tightening the chain by adjustment of the latter, the jaws are made movable in a vertical direction so as to lift the pipe and thereby tighten the chain. In this construction the jaws, which are indicated at S S', are preferably guided with relation to the bed-plate so that they do not move or tilt laterally, and for this purpose I prefer to provide a pin or pins T, which pass through holes in the bed-plate A. By preference each jaw is provided with two pins, one at each end, and these pins may be separately constructed or formed integrally with the jaws. Preferably also they are provided with heads T' which limit the upward movement of the jaws. The adjustment of the jaws may be accomplished in any suitable way, but I prefer that illustrated wherein a single adjusting member, such as a screw U, is utilized to adjust both jaws. For this purpose the jaws are preferably united by a pin V, and are provided at their lower edges with a plate or plates W extending from one jaw to the other, as best shown in Fig. 6. The jaws may be provided with beveled recesses X and the plate or plates W suitably beveled at their edges so as to properly hold their positions.

In order to maintain the jaws in their separated positions each jaw is preferably provided with a lateral abutment Y surrounding the bolt or pin V, the inner faces of the abutments contacting with each other, as illustrated in Fig. 6. The threaded bolt U engages a screw-threaded bore in the bed-plate, and contacts with the under side of the plate W to about its central point. If desired the pins T may be made slightly smaller than the holes in the bed-plate through which they pass, thus permitting the jaws to rock slightly whereby to equalize the strains.

While I have shown in detail several embodiments of my invention, I do not wish to be limited thereto, as various changes can be made therein without departing from the invention.

I do not in this application claim specifically the constructions shown in Figs. 3, 4, 5 and 6. These constructions form the subjects matter of other applications (Nos. 668,062 and 668,063) filed by me on even date herewith.

What I claim is:—

1. A chain pipe vise including in combination a pair of jaws and a chain operating in a plane between said jaws, a bed plate carrying said pair of jaws fixedly and said chain adjustably, one end of said chain being fast and the other end free to be passed over a pipe supported on said jaws and to be locked at determined intervals in its length so as to embrace pipes of different sizes, and means for thereafter pulling both ends of said chain to tighten it on the pipe.

2. A chain pipe vise including in combination a pair of jaws and a chain operating in a plane between said jaws, a cross-piece to which one end of said chain is fast, and a lock on the opposite end of said cross-piece for engagement with the free end of the chain at determined intervals, so as to permit the chain to embrace pipes of different diameters, a bed plate carrying said jaws fixedly and means for adjusting said cross-piece relatively to said bed plate so as to pull both ends of the chain to tighten it on the pipe.

3. A chain pipe vise including in combination a pair of jaws and a chain operating in a plane between said jaws, one end of said chain being fast and the other end free to be passed over a pipe supported on said jaws and to be locked at determined intervals in its length so as to embrace pipes of different sizes, a member located between said jaws and adapted to be connected to both ends of the chain, a bed-plate, a threaded rod engaging said member and passing through said bed plate, and a nut engaging said rod and bearing against the under side of the bed-plate for pulling the rod down to tighten the chain.

4. A chain pipe vise including in combination a jaw, a chain adapted to be fastened at one of its ends at one side of the pipe and having a free end adapted to be passed over a pipe on said jaw and to be fastened adjustably at determined intervals in its length so as to embrace pipes of different diameters, a quick take-up screw for taking up the slack of said chain, and a slow power screw for tightening the grip on the pipe.

5. A chain pipe vise including in combination a jaw, a chain adapted to be fastened at one of its ends at one side of the pipe and having a free end adapted to be passed over a pipe on said jaw and to be fastened adjustably at determined intervals in its length so as to embrace pipes of different diameters, and means for taking up the slack of the chain and tightening the grip, said means including a differential screw.

6. A chain pipe vise including in combination a jaw, a chain adapted to be fastened at one of its ends at one side of the pipe and having a free end adapted to be passed over a pipe on said jaw and to be fastened adjustably at determined intervals in its length so as to embrace pipes of different diameters, and means for taking up the slack of the chain and tightening the grip, said means including a pin, a power screw having a thread of low pitch engaging a corresponding thread on said pin, and a quick take-up screw having a thread of greater pitch engaging a corresponding thread on said power screw.

In witness whereof, I have hereunto signed my name in the presence of two subscribing witnesses.

GEORGE AMBORN.

Witnesses:
 CHARLES B. HARRIS,
 VICTOR F. ROBINS.

Copies of this patent may be obtained for five cents each, by addressing the "Commissioner of Patents, Washington, D. C."